(12) United States Patent
Aoki

(10) Patent No.: US 10,259,666 B2
(45) Date of Patent: Apr. 16, 2019

(54) PRESSURIZED TANK AND A DEVICE AND METHOD FOR FEEDING POWDER TO A PIPING FOR CONVEYING THE POWDER

(71) Applicant: SINTOKOGIO, LTD., Nagoya-shi, Aichi (JP)

(72) Inventor: Yukinori Aoki, Fukuoka (JP)

(73) Assignee: SINTOKOGIO, LTD., Aichi (JP)

( * ) Notice: Subject to any disclaimer, the term of this patent is extended or adjusted under 35 U.S.C. 154(b) by 162 days.

(21) Appl. No.: 15/126,155

(22) PCT Filed: Jul. 17, 2014

(86) PCT No.: PCT/JP2014/068989
§ 371 (c)(1),
(2) Date: Sep. 14, 2016

(87) PCT Pub. No.: WO2015/136724
PCT Pub. Date: Sep. 17, 2015

(65) Prior Publication Data
US 2018/0170691 A1   Jun. 21, 2018

(30) Foreign Application Priority Data
Mar. 14, 2014 (JP) ................... 2014-051760

(51) Int. Cl.
*B65G 53/22* (2006.01)
*B65G 53/36* (2006.01)
(Continued)

(52) U.S. Cl.
CPC .......... *B65G 53/525* (2013.01); *B65G 53/22* (2013.01); *B65G 53/36* (2013.01);
(Continued)

(58) Field of Classification Search
CPC .................. B65G 53/525; B65G 53/4691
(Continued)

(56) References Cited

U.S. PATENT DOCUMENTS 3,776,600 A    12/1973  McLeod, Jr.
4,715,748 A *  12/1987  Krambrock .......... B65G 53/525
                                                        406/11
(Continued)

FOREIGN PATENT DOCUMENTS

CN    201842504    5/2011
DE       306706    7/1918
(Continued)

OTHER PUBLICATIONS

Machine Translation of JP 2006131330 A from Espacenet (wordwide.espacenet.com).*
(Continued)

*Primary Examiner* — Jeremy Carroll
(74) *Attorney, Agent, or Firm* — Finnegan, Henderson, Farabow, Garrett & Dunner, LLP

(57) ABSTRACT

A pressurized tank is provided in which no air flows back from a piping for conveying powder to the pressurized tank. A pressurized tank (A) is used for a device (B) for intermittently feeding a predetermined amount of powder to a piping (7) for conveying the powder when the powder is conveyed in a plug flow through the piping (7) by means of compressed air. The tank (A) has a first pressurized room (6) that is a pressure vessel and that has a funnel-shaped upper partition (3) that has an opening and a funnel-shaped lower partition (4) that also has an opening, a first check valve (9) that is provided beneath the opening of the upper partition (3) of the first pressurized room (6) and is vertically moved so as to be upwardly moved by means of compressed air to close the opening of the upper partition (3), a second check valve (10) that is provided beneath the opening of the lower partition (4) of the first pressurized room (6) and is vertically moved so as to be upwardly moved by means of compressed air to close the opening of the lower partition (4), and an
(Continued)

elastic body (24) to upwardly bias the second check valve (10).

5 Claims, 1 Drawing Sheet

(51) Int. Cl.
    *B65G 53/46*     (2006.01)
    *B65G 53/52*     (2006.01)

(52) U.S. Cl.
    CPC .... *B65G 53/4691* (2013.01); *B65G 2201/042* (2013.01); *B65G 2812/1616* (2013.01); *B65G 2812/1641* (2013.01)

(58) Field of Classification Search
    USPC .......................................................... 222/368
    See application file for complete search history.

(56) References Cited

U.S. PATENT DOCUMENTS

| | | | |
|---|---|---|---|
| 8,113,745 B2* | 2/2012 | Aoki ................... | B65G 53/525 406/126 |
| 2010/0021248 A1* | 1/2010 | Aoki ................... | B65G 53/525 406/31 |

FOREIGN PATENT DOCUMENTS

| | | |
|---|---|---|
| DE | 35 28 301 | 2/1987 |
| DE | 3528301 | 2/1987 |
| EP | 0 176 627 A2 | 4/1986 |
| FR | 1478971 | 4/1967 |
| JP | 2006-104826 | 4/2006 |
| JP | 2006-131330 | 5/2006 |
| JP | 4893993 | 3/2012 |
| RU | 1770238 A1 | 10/1992 |
| SU | 502809 | 2/1976 |
| SU | 719950 A1 | 3/1980 |
| SU | 1389188 A1 | 6/1991 |
| WO | WO 2007/139106 | 12/2007 |

OTHER PUBLICATIONS

Chinese Office Action issued in Application No. 201480077033.4, dated Mar. 7, 2017.
European Search Report issued by the European Patent Office in European Application No. 17001875, dated Feb. 26, 2018.
Office Action issued by the Russian Patent Office in corresponding Russian Patent Application No. 20161385451/11(061375), dated Feb. 9, 2018.
English-language International Search Report from the Japanese Patent Office for International Application No. PCT/JP2014/068989, dated Oct. 7, 2014.
Office Action issued by the Russian Patent Office in corresponding Russian Patent Application No. 2016138545/11(061375), dated Jul. 17, 2018.

* cited by examiner

PRESSURIZED TANK AND A DEVICE AND METHOD FOR FEEDING POWDER TO A PIPING FOR CONVEYING THE POWDER

TECHNICAL FIELD

The present invention relates to a pressurized tank for intermittently feeding a predetermined amount of powder to a piping for conveying the powder when it is conveyed in a plug flow by means of compressed air through the piping. It also relates to a device and method for feeding the powder to the piping by using that pressurized tank.

BACKGROUND ART

The inventors of this invention invented a device for intermittently feeding powder to a piping for conveying the powder. That device comprises a pressurized tank that is a pressure vessel, and which tank has a tank body that has a port for loading in an upper wall and a port for discharging in a lower wall, a first check valve that is provided beneath the port for loading and is vertically moved so as to be upwardly moved by means of compressed air to close the port for loading, and a second check valve that is provided beneath the port for discharging and is vertically moved so as to be upwardly moved by compressed air to close the port for discharging. The device also comprises a hopper that stores the powder to be conveyed and has a port for discharging the powder at the bottom, which port faces the port for loading. The device also comprises a chute that connects the port for discharging the powder of the hopper with the port for loading of the tank body. The device also comprises a valve casing, one end of which is hermetically attached to a lower outer surface of the tank body so as to enclose the port for discharging of the tank body, and the other end of which is connected to a proximal end of the piping for conveying the powder (see Japanese Patent No. 4893993).

However, by the device for feeding powder to the piping that is configured as above, a differential pressure between the pressurized tank and the piping for conveying the powder must be high, for example, 50 kPa or more, so as to activate the second check valve. This is because the second check valve has a weight to match a robust structure for closing the port for discharging and for supporting the powder on the port. Since the differential pressure must be high in the second check valve, the second check valve may often open before the compressed air has been completely exhausted from the pressurized tank, under some conditions (e.g., the timing of pressurization, or the amount of the powder to be conveyed). If so, air or conveyed material (powder) flows back from the piping for conveying the powder to the pressurized tank so that the compressed air is wasted, i.e., without being used for conveying the powder. That has been a problem.

When powder is conveyed from a plurality of the pressurized tanks to one piping for conveying the powder, air or conveyed material may flow from one pressurized tank to another pressurized tank. This has been a problem. To solve this problem, a measure may be proposed to simultaneously pressurize the plurality of the pressurized tanks. However, a problem would occur in that the plugs of the powder being conveyed may concentrate or in that fluctuations of momentum may become large so that a vibration or noise in the piping becomes large. Further, a fluctuation in the consumption of the compressed air may become large so that a measure to absorb it would cause the cost to increase.

Further, if some of the pressurized tanks have the flow of air or material suspended, air or conveyed material may flow to the suspended pressurized tanks until the pressure in the piping for conveying the powder achieves a level sufficient to activate the second check valve. Thus a device or a procedure to separate the suspended pressurized tank from the piping for conveying the powder is required, resulting in an increase in the cost.

DISCLOSURE OF INVENTION

This invention was conceived to solve the above-mentioned problems. It aims to provide a pressurized tank by which no air is leaked to such a pressurized tank by a residual pressure in a piping for conveying powder when the powder is intermittently fed to the piping. It also aims to provide a device or method for feeding powder to the piping for conveying the powder by which no air or conveyed material flows back from the piping to the tank when a plurality of the tanks are used.

In a first aspect of the present invention, a pressurized tank is a tank that is used in a device for intermittently feeding a predetermined amount of powder to a piping for conveying the powder when the powder is conveyed in a plug flow through the piping for conveying the powder by means of compressed air. The tank has a first pressurized room that is a pressure vessel and that has a funnel-shaped upper partition that has an opening and a funnel-shaped lower partition that has an opening. The tank also has a first check valve that is provided beneath the opening of the upper partition of the first pressurized room and is vertically moved so as to be upwardly moved by means of compressed air to close the opening of the upper partition. The tank also has a second check valve that is provided beneath the opening of the lower partition of the first pressurized room and is vertically moved so as to be upwardly moved by means of compressed air to close the opening of the lower partition. The tank also has an elastic body to upwardly bias the second check valve.

By the first aspect of the present invention, since the elastic body upwardly biases the second check valve, the second check valve is surely activated by a low differential pressure. Thus no air is leaked to the pressurized tank by a residual pressure in the piping for conveying the powder, so that the problem of wasting compressed air is solved.

In a second aspect of the present invention, the elastic body is a coil spring that cancels a weight of the second check valve by hanging the second check valve in the pressurized tank of the first aspect.

By the second aspect of the present invention, since the coil spring cancels the weight of the second check valve, the second check valve is surely activated by a low differential pressure.

A third aspect of the present invention is a device for intermittently feeding a predetermined amount of powder to a piping for conveying the powder by using the pressurized tank of the first or second aspect. The device comprises a hopper that stores powder to be conveyed and has a port for discharging the powder at a bottom and that has a cutoff gate. It also comprises a hollow room that connects the port for discharging the powder of the hopper with the opening of the upper partition of the first pressurized room. It also comprises a second pressurized room, one end of which is hermetically attached to a lower outer surface of the first pressurized room so as to enclose the opening of the lower partition of the first pressurized room, and the other end of which is connected to a proximal end of the piping for conveying the powder. It also comprises a first shut-off valve that connects and disconnects a lower surface of the first check valve with an air source through a first piping. It also comprises a second shut-off valve that connects and disconnects a lower surface of the second check valve with an air source through a second piping. It also comprises a third shut-off valve that can discharge the compressed air in the first piping. It also comprises a sensor that detects a presence or an absence of powder in the first pressurized room of the pressurized tank. It also comprises a controller that controls the cutoff gate and the first, second, and third shut-off valves based on detection by the sensor, so that the cutoff gate and the first, second, and third shut-off valves open and close to function together.

By the third aspect of the present invention, since the second check valve is upwardly biased by the elastic body, it is surely activated by a low differential pressure. Thus no air is leaked to the pressurized tank by the residual pressure in the piping for conveying the powder, so as to intermittently feed the powder to the piping for conveying the powder without wasting the compressed air.

A fourth aspect of the present invention is a method for intermittently feeding powder to a piping for conveying the powder by using the device of the third aspect. The method comprises the steps of (1) when the sensor detects an absence of the powder, then, under the control of the controller, closing the first shut-off valve and opening the third shut-off valve, to discharge the compressed air from the first pressurized room of the pressurized tank, (2) opening the cutoff gate to feed the powder in the hopper to the hollow room, supplying the compressed air from the opened second shut-off valve to the second check valve and the second pressurized room, so as to upwardly move the second check valve to close the opening of the lower partition of the first pressurized room, so as to convey the powder in the piping for conveying the powder in a plug flow by the compressed air, and so as to downwardly move the first check valve by a weight of the first check valve and a weight of the powder that has flowed from the hopper to open the opening of the upper partition of the first pressurized room to supply the powder in the hollow room to the first pressurized room, and at a lapse of a predetermined time after the sensor detects the absence of the powder, closing the second shut-off valve to stop supplying compressed air to the second check valve and the second pressurized room, (3) when the sensor detects a presence of the powder after the powder has flowed into the first pressurized room, then, under the control of the controller, closing the cutoff gate, closing the third shut-off valve, and opening the first shut-off valve so that compressed air is supplied to the first check valve and the first pressurized room so as to upwardly move the first check valve to close the opening of the upper partition of the first pressurized room and so as to downwardly move the second check valve by means of pressure at the first pressurized room and a weight of the powder to open the opening of the lower partition of the first pressurized room, and (4) immediately after the opening of the lower partition is opened, opening the second shut-off valve to supply compressed air to the second shut-off valve without upwardly moving the second check valve so as to fluidize the powder that is passing through the opening of the lower partition of the first pressurized room by means of air that has flowed from the second check valve, so that the powder in the first pressurized room is fed to the piping for conveying the powder.

By the fourth aspect of the present invention, since the second check valve is upwardly biased by the elastic body, it is surely activated by a low differential pressure. Thus no air is leaked to the pressurized tank by the residual pressure in the piping for conveying the powder, so that the powder can be intermittently fed to the piping without wasting compressed air.

A fifth aspect of the present invention is a method for intermittently feeding powder to a piping for conveying the powder by using a plurality of the devices of the third aspect, wherein timing for activating the cutoff gate and the first, second, and third shut-off valves of each device is delayed by a time (1/N) that is divided by a number (N) of devices to be used.

By the fifth aspect of the present invention, since the second check valve is upwardly biased by the elastic body, it is surely activated by a low differential pressure. Thus, when the powder is fed from a plurality of the devices to a piping for conveying the powder, neither air nor conveyed material (powder) flows back from the piping to the pressurized tank. And so the operation of each pressurized tank (timing for activating the devices) can be sequentially delayed. By sequentially delaying the timing for activating the devices, the peak of consumed compressed air can be dispersed to lighten the load of the system for supplying compressed air. Further, since the peak amount of the powder to be fed to the piping for conveying the powder is dispersed, the plug flow becomes small, to reduce the noise and vibration when the powder is conveyed.

As is apparent from the above discussion, the present invention provides a pressurized tank by which no air is leaked to the pressurized tank by the residual pressure in the piping for conveying the powder when the powder is intermittently fed to the piping for conveying the powder, provides a device and method for feeding powder to the piping for conveying the powder that uses that pressurized tank, and provides a method for feeding powder to a piping for conveying the powder by which neither air nor conveyed material flows back from the piping to the pressurized tank even when a plurality of the pressurized tanks are used.

The basic Japanese patent application, No. 2014-051760, filed Mar. 14, 2014, is hereby incorporated by reference in its entirety in the present application. The present invention will become more fully understood from the detailed description given below. However, the detailed description and the specific embodiments are only illustrations of the desired embodiments of the present invention, and so are given only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present invention in the sense of the doctrine of equivalents.

The use of the articles "a," "an," and "the" and similar referents in the specification and claims are to be construed to cover both the singular and the plural form of a noun, unless otherwise indicated herein or clearly contradicted by the context. The use of any and all examples, or exemplary language (e.g., "such as") provided herein is intended merely to better illuminate the invention, and so does not limit the scope of the invention, unless otherwise stated.

BEST MODE FOR CARRYING OUT THE INVENTION

Figure 1:
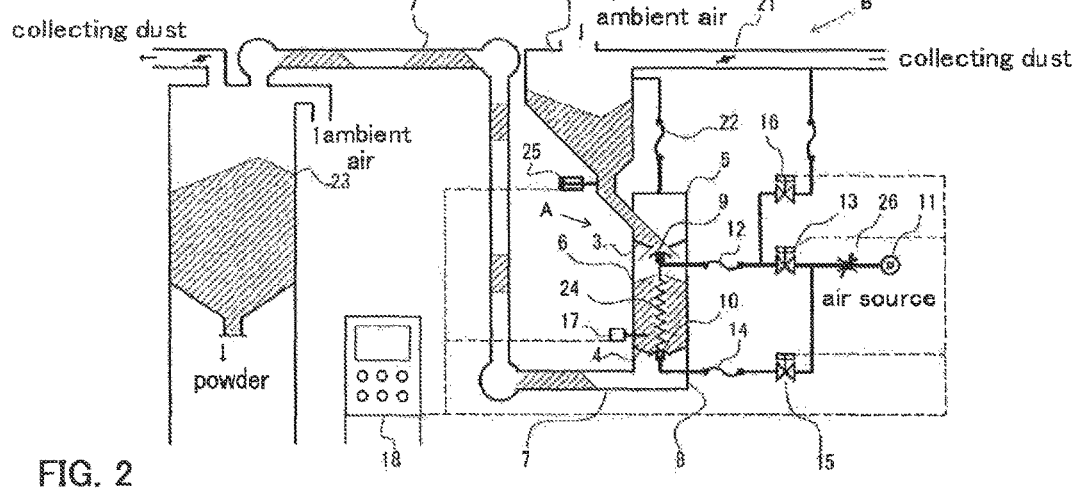
FIG. 1 shows a schematic diagram of the device for feeding powder to the piping for conveying the powder that uses the pressurized tank of the present invention.

Below, a device B for feeding powder to the piping for conveying the powder of the present invention is discussed with reference to FIG. 1.

A pressurized tank A that is used in a device for intermittently feeding powder to a piping 7 for conveying the powder, when the powder is conveyed in a plug flow through the piping 7 for conveying the powder by means of compressed air, has a first pressurized room 6 that is a pressure vessel and that has a funnel-shaped upper partition 3 that has an opening and a funnel-shaped lower partition 4 that has an opening. It also has a first check valve 9 that is provided underneath the opening of the upper partition 3 of the first pressurized room 6 and is vertically moved so as to be upwardly moved by means of compressed air to close the opening of the upper partition 3. It also has a second check valve 10 that is provided underneath the opening of the lower partition 4 of the first pressurized room 6 and is vertically moved so as to be upwardly moved by means of compressed air to close the opening of the lower partition 4. It also has an elastic body 24 to upwardly bias the second check valve 10. In this embodiment, a coil spring 24 is used for the elastic body to hang the second check valve 10. However, the elastic body is not limited to this configuration. For example, any type of spring or elastic band may be used to hang it. Alternatively, any type of spring or elastic column or block may support it from underneath. The openings of the upper partition 3 and the lower partition 4 are preferably formed at the centers so as to facilitate manufacturing them and to prevent uneven distribution of the powder.

The device B for feeding powder to the piping for conveying the powder has a hopper 1 that stores the powder to be conveyed and a cutoff gate 25 on a route to a port for discharging the powder that is located at the bottom of it. It also has a hollow room 5 that connects the port for discharging the powder of the hopper 1 with the opening of the upper partition 3 of the first pressurized room 6 of the pressurized tank A. It also has a second pressurized room 8, one end of which is hermetically attached to the lower outer surface of the first pressurized room 6 so as to enclose the opening of the lower partition 4 of the first pressurized room 1, and the other end of which is connected to the proximal end of the piping 7 for conveying the powder. It also has a first shut-off valve 13 that connects and disconnects the lower surface of the first check valve 9 with an air source 11 through a first piping 12. It also has a second shut-off valve 15 that connects and disconnects the lower surface of the second check valve 10 with the air source 11 through the second piping 14. It also has a third shut-off valve 16 that can discharge the compressed air in the first piping 12. It also has a sensor 17 that detects a presence or an absence of powder in the first pressurized room 6 of the pressurized tank A. It also has a controller 18 that controls the cutoff gate 25 and the first, second, and third shut-off valves 13, 15, 16 based on the detection by the sensor 17, so that they open and close to function together. For the first, second, and third shut-off valves 13, 15, 16 an electromagnetic valve may be used. Alternatively a valve that is driven by pneumatic pressure, mechanical force, or any other force may be used.

In the first and second check valves 9, 10, after they upwardly move, by means of supplied compressed air, to some extent or to the highest positions the compressed air can flow outside the lower parts of them. Namely, while the force to upwardly move the first or second check valve 9, 10 is applied, the compressed air is supplied to the first or second pressurized room 6, 10 that is located under the first and second check valves 9, 10, respectively. The third shut-off valve 16 is connected to a duct 21 that is connected to a dust collector (not shown). The hollow room 5 of the pressurized tank A is connected to the upper part of the hopper 1 through a piping 22 so that the pressure in the hollow room 5 is equal to that in the hopper 1. The distal end of the piping 7 for conveying the powder is connected to a tank 23 for storing the powder. The reference numeral "26" in the figure denotes a flow control valve. The coil spring 24 cancels the weight of the second check valve 10. The flow control valve 26 controls the flow of air from the air source 11 to the entire device B.

Working Example 1

Below, the operation and the function of an embodiment of the device for feeding powder to the piping for conveying the powder that uses the pressurized tank of the present invention is discussed with reference to FIG. 1.

[Step of Discharging Compressed Air]

When the sensor 17 detects the absence of powder, the controller 18 controls the first shut-off valve 13 so as to close it and the third shut-off valve 16 so as to open it, so that the compressed air is discharged from the first pressurized room 6 of the pressurized tank A.

[Step of Feeding Powder]

Next, by opening the cutoff gate 25, the powder in the hopper 1 is fed to the port for discharging it. Then, the powder glides down due to gravity to flow into the hollow room 5 of the pressurized tank A. During this operation, the second shut-off valve 15 is kept open so that the compressed air is supplied to the second check valve 10 and the second pressurized room 8. Since the pressure in the first pressurized room 6 becomes low in the step of discharging the compressed air, the pressure in the second pressurized room 8 becomes higher than that by the compressed air that is supplied through the second shut-off valve 15 that is open. Because of this differential pressure the second check valve 10, the weight of which is cancelled by the coil spring 24, upwardly moves to close the opening of the lower partition 4 of the first pressurized room 6. At the same time the powder that has been in the piping 7 for conveying the powder is conveyed in a plug flow by the compressed air.

Further, since the pressure in the first pressurized room 6 becomes low in the step of discharging the compressed air, the first check valve 9 is downwardly moved by the weight of the first check valve 9 and the weight of the powder that has flowed from the hopper 1 to open the opening of the upper partition 3 of the first pressurized room 6. Thus the powder in the hollow room 5 is fed to the first pressurized room 6.

After a lapse of a certain time after the sensor 17 detects the absence of powder, the controller 18 controls the second shut-off valve 15 so as to close it to stop the flow of the compressed air to the second check valve 10 and the second pressurized room 8. Incidentally, since the powder in the state of plugs stays in the piping 7 for conveying the powder, closing the second shut-off valve 15 does not immediately make the pressure in the second pressurized room 10 reach that of the tank 23 for storing the powder. That certain time is discussed below. The time when the first shut-off valve 13 is opened and the time when the sensor 17 detects the absence of powder are detected. The length of time between these two times is a time frame for the powder in the first pressurized room 6 to be fed to the piping 7 for conveying the powder. The time frame for the next powder to be fed from the first pressurized room 6 to the piping 7 for conveying the powder, namely, the time frame for creating an interval (or a space) between the two plugs, is set to be constant. The certain time may be calculated by multiplying the time frame by a factor that is determined based on the ratio of the volume in the piping 7 for conveying the powder to the volume in the first pressurized room 6 (about 3:1 at the minimum). That is, the factor may be determined based on the ratio of the powder acting as plugs to the internal volume of the piping 7 for conveying the powder to determine the certain time. However, such a calculation is not necessary and an arbitrary time may be used. Depending on the time of one cycle or the timing for pressurizing, the supply of the compressed air to the second check valve 10 and the second pressurized room 8 may not need to be stopped.

[Step of Pumping Out]

After these operations have been carried out, when the sensor 17 detects the presence of the powder after feeding the powder to the first pressurized room 6, the controller 18 controls the third shut-off valve 16 so as to close it and the first shut-off valve 13 so as to open it, so that the compressed air is supplied to the first check valve 9 and the first pressurized room 6. At the same time, the cutoff gate 25 is closed. Thus the first check valve 9 is upwardly moved to close the upper opening of the first pressurized room 6 so that the first pressurized room 6 is pressurized. When the pressure in the first pressurized room 6 becomes equal to that in the second pressurized room 8 and the piping 7 for conveying the powder, which are located under the first pressurized room 6, the second check valve 10 is pressed by the pressure in the first pressurized room 6 and the weight of the powder to downwardly move so that the opening of the lower partition 4 of the first pressurized room 6 is opened. Immediately after that, the second shut-off valve 15 is opened to supply the compressed air to the second check valve 10. At this time, though the compressed air is supplied to the second check valve 10, the second check valve 10 is not upwardly moved, but the air flows outside the second check valve 10 to fluidize the powder that is passing through the opening of the lower partition 4 of the first pressurized room 6. The fluidized powder is at once fed from the second pressurized room 8 to the piping 7 for conveying the powder. The flowability of the powder becomes good by fluidization. Thus without resistance the powder is fed to the piping 7 for conveying the powder. When the amount of the powder that remains in the first pressurized room 6 becomes little, or when feeding the powder to the piping 7 for conveying the powder is completed, the sensor 17 detects the absence of powder. Then the above-mentioned operations are repeated.

By repeating the above-mentioned operations a predetermined amount of the powder in the hopper 1 is intermittently fed to the piping 7 for conveying the powder. The powder that has been fed into the piping 7 is conveyed in a plug flow to the tank 23 for storing the powder.

In this embodiment the port for discharging the powder of the hopper 1 is connected to the opening of the upper partition 3 of the first pressurized room 6 through the hollow room 5. However, if, like sand, the powder does not easily fly, the hollow room 5 may be omitted to directly connect the port for discharging the powder of the hopper 1 to the opening of the upper partition 3 of the first pressurized room 6.

The sensor 17 may be any type of sensor as long as it detects the presence or absence of powder. For example, a capacitance level sensor or a vibrating level sensor can be used for it.

As discussed above, the process is divided into the steps of discharging compressed air, feeding powder, and pumping the powder out. However, these steps are used just for easy discussion. The powder in the piping 7 for conveying the powder is conveyed in a plug flow by means of the supply of the compressed air from the second shut-off valve 15 as discussed in the step of feeding powder. It may be always so conveyed.

Working Example 2

Next, a method for intermittently feeding powder to a piping for conveying the powder is discussed with reference to FIG. 2. In that process three devices for feeding powder to the piping for conveying the powder are used.

Each of the devices for feeding powder is the same as the device in working example 1. Major differences are that multiple piping for conveying the powder are connected and that all sets of the sensor 17, the cutoff gate 25, and the first, second, and third shut-off valves 13, 15, 16 are connected to a sole controller 18, though this connection is not shown in the figure.

In the method for intermittently feeding powder by using multiple devices, the timing for activating the cutoff gate 25 and the first, second, and third shut-off valves 13, 15, 16 is delayed by a time (1/N) that is divided by a number (N) of the devices to be used.

The wording "the timing for activating is delayed by a time (1/N)" means that each cycle, which consists of the steps of discharging compressed air, feeding powder, and pumping out, is carried out at a delayed timing that is calculated by the time frame for the cycle being divided by the number (N) of devices. For example, in working example 2, assuming that three of the devices are used and that 12 seconds are required for one cycle, each of the devices is activated with a delay of 4 seconds, i.e., 12 seconds being divided by three.

Figure 2:
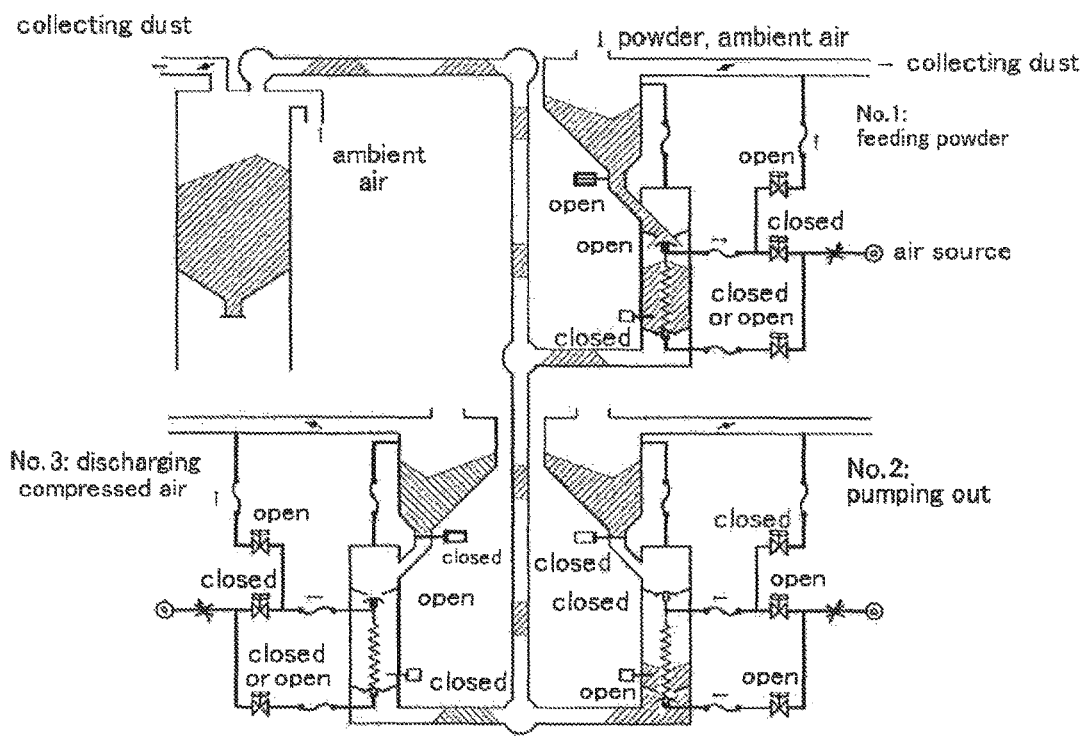
FIG. 2 shows an overall view illustrating the method for feeding powder to the piping for conveying the powder that uses the three pressurized tanks of the present invention.

For example, as in FIG. 2, device No. 1 is in the step of feeding powder, device No. 2 is in the step of pumping out, and device No. 3 is in the step of discharging compressed air. Depending on the time frame for one cycle, the timing for pressurizing, etc., each of the devices may be in different steps as in FIG. 2, but they are not limited to this status. Even if the step of pumping out were to take a long time, by using the pressurized tank of the present invention the second check valve 10 would surely function. Thus neither air nor conveyed material (the powder) flows back from the piping for conveying the powder to the pressurized tank regardless of the conveying conditions, i.e., the timing of pressurization. Though the method for intermittently feeding the powder to the piping for conveying the powder is discussed by using three devices, the number of devices is not limited to three, but may be any number.

Below, the main reference numerals and symbols that are used in the detailed description and drawings are listed.

1 the hopper
3 the upper partition
4 the lower partition
5 the hollow room
6 the first pressurized room 7 the piping for conveying the powder
8 the second pressurized room
9 the first check valve
10 the second check valve
11 the air source
12 the first piping
13 the first shut-off valve
14 the second piping
15 the second shut-off valve
16 the third shut-off valve
17 the sensor
18 the controller
22 the piping
23 the tank for storing the powder
24 the elastic body (the coil spring)
20 the cutoff gate
26 the flow control valve
A the pressurized tank
B the device for feeding powder to the piping for conveying the powder (the device for feeding powder)

The invention claimed is:

1. A pressurized tank that is used in a device for intermittently feeding a predetermined amount of powder to a piping for conveying the powder when the powder is conveyed in a plug flow through the piping for conveying the powder by means of compressed air, the tank comprising:
    a first pressurized room that is a pressure vessel and that has a funnel-shaped upper partition that has an opening and a funnel-shaped lower partition that has an opening, wherein the lower surface of the first pressurized room is configured to be hermetically attached to one end of a second pressurized room of the device so that the one end of the second pressurized room encloses the opening of the lower partition of the first pressurized room;
    a first check valve that is provided beneath the opening of the upper partition of the first pressurized room and is vertically moved so as to be upwardly moved by means of compressed air to close the opening of the upper partition;
    a second check valve that is provided beneath the opening of the lower partition of the first pressurized room and is vertically moved so as to be upwardly moved by means of compressed air to close the opening of the lower partition; and
    an elastic body to upwardly bias the second check valve, wherein the elastic body biases the second check valve so as not to open the valve when the compressed air is supplied to the second pressure room, but not to the first pressure room, and so as to open the valve when the compressed air is supplied to the first pressure room.

2. The pressurized tank of claim 1, wherein the elastic body is a coil spring that cancels a weight of the second check valve by hanging the second check valve.

3. A device for intermittently feeding a predetermined amount of powder to a piping for conveying the powder by using the pressurized tank of claim 1 or 2, the device comprising:
    a hopper that stores powder to be conveyed and has a port for discharging the powder at a bottom and that has a cutoff gate;
    a hollow room that connects the port for discharging the powder of the hopper with the opening of the upper partition of the first pressurized room;
    a second pressurized room, one end of which is hermetically attached to a lower outer surface of the first pressurized room so as to enclose the opening of the lower partition of the first pressurized room, and the other end of which is connected to a proximal end of the piping for conveying the powder;
    a first shut-off valve that connects and disconnects a lower surface of the first check valve with an air source through a first piping;
    a second shut-off valve that connects and disconnects a lower surface of the second check valve with an air source through a second piping;
    a third shut-off valve that can discharge the compressed air in the first piping;
    a sensor that detects a presence or an absence of powder in the first pressurized room of the pressurized tank; and
    a controller that controls the cutoff gate and the first, second, and third shut-off valves based on detection by the sensor, so that the cutoff gate and the first, second, and third shut-off valves open and close to function together.

4. A method for intermittently feeding powder to a piping for conveying the powder by using the device of claim 3, the method comprising the steps of:
    (1) when the sensor detects an absence of the powder, then, under control of the controller, closing the first shut-off valve and opening the third shut-off valve, to discharge the compressed air from the first pressurized room of the pressurized tank;
    (2) opening the cutoff gate to feed the powder in the hopper to the hollow room, supplying the compressed air from the opened second shut-off valve to the second check valve and the second pressurized room, so as to upwardly move the second check valve to close the opening of the lower partition of the first pressurized room, so as to convey the powder in the piping for conveying the powder in a plug flow by the compressed air, and so as to downwardly move the first check valve by a weight of the first check valve and a weight of the powder that has flowed from the hopper to open the opening of the upper partition of the first pressurized room to supply the powder in the hollow room to the first pressurized room, and after a lapse of a predetermined time after the sensor detects the absence of the powder, closing the second shut-off valve to stop supplying compressed air to the second check valve and the second pressurized room;
    (3) when the sensor detects a presence of the powder after the powder has flowed into the first pressurized room, then, under the control of the controller, closing the cutoff gate, closing the third shut-off valve, and opening the first shut-off valve so that compressed air is supplied to the first check valve and the first pressurized room so as to upwardly move the first check valve to close the opening of the upper partition of the first pressurized room and so as to downwardly move the second check valve by means of pressure at the first pressurized room and a weight of the powder to open the opening of the lower partition of the first pressurized room; and
    (4) immediately after the opening of the lower partition is opened, opening the second shut-off valve to supply compressed air to the second check valve without upwardly moving the second check valve so as to fluidize the powder that is passing through the opening of the lower partition of the first pressurized room by means of air that has flowed from the second check valve, so that the powder in the first pressurized room is fed to the piping for conveying the powder.

5. A method for intermittently feeding a predetermined amount of powder to the piping for conveying the powder by using a plurality of the devices of claim 3, wherein timing for activating the cutoff gate and the first, second, and third shut-off valves of each device is delayed by a time (1/N) that is divided by a number (N) of devices to be used.

* * * * *